US010606824B1

(12) United States Patent
Fire et al.

(10) Patent No.: US 10,606,824 B1
(45) Date of Patent: Mar. 31, 2020

(54) UPDATE SERVICE IN A DISTRIBUTED ENVIRONMENT

(71) Applicant: A9.com, Inc., Palo Alto, CA (US)

(72) Inventors: Kaolin Imago Fire, Berkeley, CA (US); Mark Jay Nitzberg, Berkeley, CA (US); Sunil Ramesh, San Jose, CA (US)

(73) Assignee: A9.COM, INC., Palo Alto, CA (US)

( * ) Notice: Subject to any disclaimer, the term of this patent is extended or adjusted under 35 U.S.C. 154(b) by 830 days.

(21) Appl. No.: 14/849,275

(22) Filed: Sep. 9, 2015

(51) Int. Cl.

| | | |
|---|---|---|
| G06F 16/23 | (2019.01) | |
| G06Q 10/10 | (2012.01) | |
| H04W 4/021 | (2018.01) | |
| G06K 9/46 | (2006.01) | |
| G06K 9/62 | (2006.01) | |
| G06K 9/00 | (2006.01) | |
| G06F 16/583 | (2019.01) | |

(Continued)

(52) U.S. Cl.
CPC .......... *G06F 16/2365* (2019.01); *G06F 16/00* (2019.01); *G06F 16/2379* (2019.01); *G06F 16/29* (2019.01); *G06F 16/583* (2019.01); *G06F 16/955* (2019.01); *G06K 9/00476* (2013.01); *G06K 9/18* (2013.01); *G06K 9/46* (2013.01); *G06K 9/6201* (2013.01); *G06Q 10/10* (2013.01); *H04W 4/021* (2013.01)

(58) Field of Classification Search
CPC ...................... G06F 17/30371; G06K 9/00476
USPC ......................................................... 705/342
See application file for complete search history.

(56) References Cited

U.S. PATENT DOCUMENTS

| | | | | |
|---|---|---|---|---|
| 8,462,991 B1 * | 6/2013 | Clements | .............. | G06F 16/583 |
| | | | | 382/112 |
| 8,781,255 B2 * | 7/2014 | Lin | ...................... | G06K 9/4676 |
| | | | | 382/291 |

(Continued)

OTHER PUBLICATIONS

Xiao, J., Hays, J., Ehinger, K.A., Oliva, A. and Torralba, A., 2010. Sun database: Large-scale scene recognition from abbey to zoo. In: Computer vision and pattern recognition (CVPR), 2010 IEEE conference on, pp. 3485-3492, (Year: 2010).*

(Continued)

*Primary Examiner* — Minnah L Seoh
*Assistant Examiner* — Richard W. Crandall
(74) *Attorney, Agent, or Firm* — Hogan Lovells US, LLP

(57) ABSTRACT

Approaches provide for updating information associated with points and/or objects of interest, such as businesses and other such entities. For example, an update service can analyze image data to determine visual features of a visual representation of a business. The visual features can be compared to information stored in a database. The information stored in the database can be derived from previously obtained image data that includes visual features corresponding to the business. A change in the visual representation of the business can be determined. The change might be due to, for example, a change in the business operating at that location which can result in a change in the visual appearance of the business; an update to business hours, contact information, or other information. Once the change is determined to at least a threshold amount, an event to update business information (e.g., the name of the business, contact information, images, etc.) of the business can be generated and provided to an appropriate service.

20 Claims, 6 Drawing Sheets

(51) Int. Cl.
*G06K 9/18* (2006.01)
*G06F 16/955* (2019.01)
*G06F 16/00* (2019.01)
*G06F 16/29* (2019.01)

(56) References Cited

U.S. PATENT DOCUMENTS

| | | | | |
|---|---|---|---|---|
| 8,798,378 | B1* | 8/2014 | Babenko | G06K 9/00671 |
| | | | | 382/224 |
| 8,890,896 | B1* | 11/2014 | Tseng | G05D 1/0278 |
| | | | | 345/633 |
| 9,286,545 | B1* | 3/2016 | Anguelov | G06T 11/003 |
| 2008/0144943 | A1* | 6/2008 | Gokturk | G06F 17/3025 |
| | | | | 382/224 |
| 2008/0240513 | A1* | 10/2008 | Xie | G01C 21/32 |
| | | | | 382/113 |
| 2011/0052073 | A1* | 3/2011 | Wallace | G06K 9/00704 |
| | | | | 382/190 |
| 2013/0325328 | A1* | 12/2013 | Anguelov | G01C 21/32 |
| | | | | 701/445 |
| 2015/0169977 | A1* | 6/2015 | Corpet | G06K 9/46 |
| | | | | 382/201 |
| 2016/0275102 | A1* | 9/2016 | Haro | G06F 16/29 |

OTHER PUBLICATIONS

Inside Google Street View: From Larry Page's Car to the Depths of the Grand Canyon, Techcrunch.com [online], available at: <https://techcrunch.com/2013/03/08/ inside-google-street-view-from-larry-pages-car-to-the-depths-of-the-grand-canyon/> (Year: 2013).*

Reference Y Anderson, Brian, How to 3D Map Your Own Drone Streetview, Nov. 8, 2012, Vice Motherboard [online], available at: <https://motherboard.vice.com/en_us/article/mgggax/how-to-3d-map-your-own-drone-streetview> (Year: 2012).*

Reference V1 Get iPhone Photo GPS and Geolocation Data, Jul. 6, 2010, [online], available at: <http://osxdaily.com/2010/07/06/get-iphone-photo-gps-geolocation-data/> (Year: 2010).*

Xiao, J., Hays, J., Ehinger, K.A., Oliva, A. and Torralba, A., 2010. Sun database: Large-scale scene recognition from abbey to zoo. In: Computer vision and pattern.*

Halliday, Josh, Google Faces New Street View Data Controversy, The Guardian online, Jul. 27, 2012, available at: <https://www.theguardian.com/technology/2012/jul/27/google-street-view-controversy> (Year: 2012).*

Inside Google Street View: From Larry Page's Car to the Depths of the Grand Canyon, Techcrunch.com [online], available at: <https://techcrunch.com/2013/03/08/inside-google-street-view-from-larry-pages-car-to-the-depths-of-the-grand-canyon/> (Year: 2013).*

Reference Y Anderson, Brian, How to 3D Map Your Own Drone Streetview, Nov. 8, 2012, Vice Motherboard [online], available at: <https://motherboard.vice.com/en_us/article/mgggax/how-to-3d-map-your-own-drone-streetview> (Year: 2012).*

Reference Z Davies, Chris, Google Street View Trekker Wearable Camera Stars in Loan Program, Slashgear.com, [online], Jun. 27, 2013, <https://www.slashgear.com/google-street-view-trekker-wearable-camera-stars-in-loan-program-27288351/> (Year: 2013).*

Reference U1 Agisoft Community Forum, May 9, 2013 [online], available at: <http://www.agisoft.com/forum/index.php?topic=1236.0> (Year: 2013).*

Reference V1 Get iPhone Photo Gps and Geolocation Data, Jul. 6, 2010, [online], available at: <http://osxdaily.conn/2010/07/06/get-iphone-photo-gps-geolocation-data/> (Year: 2010).*

Reference W1 Assar, Vijith, the Evolution of the Web, in a Blink, The New Yorker, [online] May 10, 2013, available at: <https://www.newyorker.com/tech/elements/the-evolution-of-the-web-in-a-blink> (Year: 2013).*

Anguelov et al., IEEE Computer publication, published 2010, available at <http://www-scf.usc.edu/~csci572/papers/Anguelov.pdf> (Year: 2010).*

Xiao, J., Hays, J., Ehinger, K.A., Oliva, A. and Torralba, A., 2010 Sun database: Large-scale scene recognition from abbey to zoo. In: Computer vision and pattern recognition (CVPR), 2010 IEEE conference on, pp. 3485-3492. doi: 10.1109/CVPR.2010.5539970 (Year: 2010).*

* cited by examiner

UPDATE SERVICE IN A DISTRIBUTED ENVIRONMENT

BACKGROUND

As personal electronic devices become increasingly sophisticated, people are using such devices in new and interesting ways. For example, electronic devices can be used to "augment reality." That is, an electronic device can be used as a viewfinder into the real world and virtual elements can be overlaid to create a reality that is enhanced or augmented. For example, an electronic device can be used to obtain a view of an object or location, and a computer-assisted contextual layer can be displayed on top of the view to provide information about the object or location.

Information provided in the virtual reality experience can be provided by online directories. An online directory can be used to locate and find information about businesses, services, objects, and locations. A user can request such information from the online directory, using for example, an application executing on the electronic device, where the user can be prompted to enter selection criteria such as the general geographic location (e.g., state and city) and the type or category of business (e.g., restaurant) that the user is looking for, or perhaps the name of the business itself, if known. In response, listings for each of the businesses that meet the user's selection criteria are displayed. The listing typically identifies the name, address, and phone number of the listed business. Oftentimes, however, the information may be out of date, inaccurate, or not available. A user searching or using such data, either in an augmented reality situation, in a query to request information, or other such situation, may then rely on incorrect information which may cause the user rely on incorrect data. In other situations, where the search results are not available or lacking, the user may not be able to locate potential places or business or other locations. Either situation can be time consuming and potentially frustrating for a user, which can result in the user not locating the business and the business not completing a transaction and/or the user losing confidence in the online directory or other such service relaying on the information.

BRIEF DESCRIPTION OF THE DRAWINGS

Various embodiments in accordance with the present disclosure will be described with reference to the drawings, in which.

DETAILED DESCRIPTION

Figure 1:
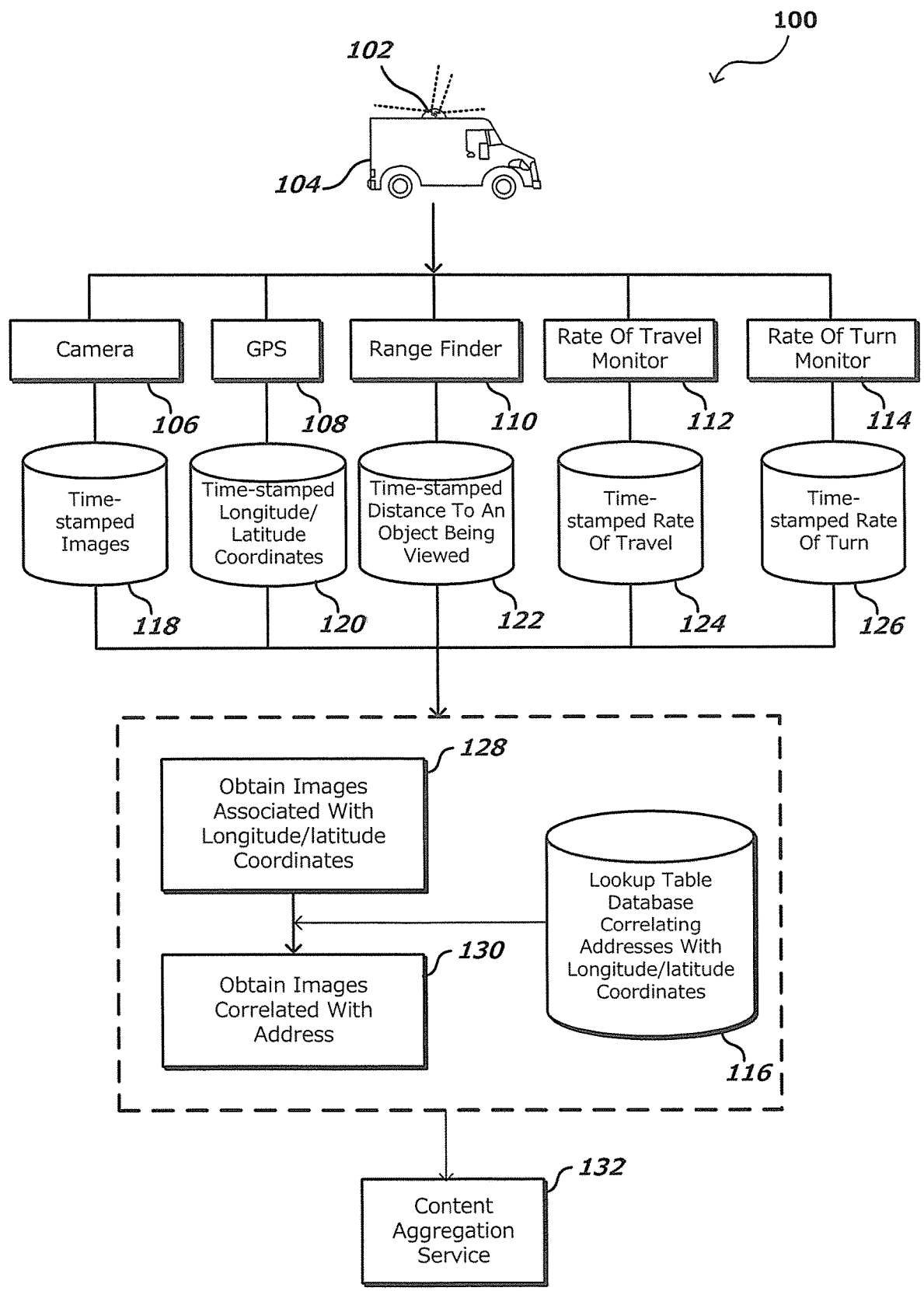
FIG. 1 illustrates an example environment for collecting locale-correlated images of objects at geographic locations for publication in an online directory that can be utilized in accordance with various embodiments.

Systems and methods in accordance with various embodiments of the present disclosure may overcome one or more of the foregoing or other deficiencies experienced in conventional approaches for obtaining and updating information relating to points and/or objects of interest such as buildings, structures, store fronts, notable scenes, etc. In particular, various embodiments provide for obtaining image data (e.g., still images and/or video data) of points and/or objects of interest and updating information associated with those points and/or objects of interest. The image data and associated information can be displayed in association with corresponding listings in online directories and by other providers of electronic content, such as an augmented reality service provider.

In accordance with various embodiments, a content aggregation service can obtain image data from any number of sources. The sources can include electronic devices (e.g., mobile phones, wearable devices, motor vehicles, unmanned aerial vehicles, etc.), social media directories, crowd-sourced image data, etc. The image data can be provided to online content providers, such as online directories, for example, to be displayed in association with corresponding listing in the online directories, as well as other services such as augmented reality service providers. In many situations, however, the information may be out of date, inaccurate, or not available at least in part because the content providers have not received updated information reflecting, for example, current location of business entities, notable scenes, and the like. Accordingly, the information can be updated by an update service or other such service.

The update service can analyze the image data to determine whether there has been a change to the points and/or objects of interest or objects represented in the image data. For example, the image data can include a representation of a business or other such entity as well as be associated with metadata data that includes geographic coordinates corresponding to where the image data was obtained. Using the geographic coordinates, the image data can be correlated with a locale. The locale includes the area where the points and/or objects of interest are located or are otherwise associated with. The locale can be determined using traditional position information (e.g., physical address information) as well as other information that can be used to determine a location of points and/or objects of interest. The information can include, e.g., GPS coordinates, navigation and orientation information derived from a compass, distance information of the computing device to the object and/or point of interest, height information of the object and/or point of interest to the computing device. The information can be obtained using various sensors and devices as will be described further herein. The image data can be analyzed to determine visual features of a visual representation of the business. As will be described further herein, one such image analysis approach can utilize deep learning as used in localization pipelines for image recognition. The visual features can include, for example, text or images on the exterior of the business, the design of the business, as well as any aspects of the interior of the business represented in the image data. The visual features can be compared to information stored in a database or other storage device. The information stored in the database can be derived from previously obtained image data that includes visual features corresponding to the business. A change in the visual representation of the business can be determined. The change might be due to, for example, a change in the business operating at that location which can result in a change in the visual appearance of the business; an update to business hours, contact information, or other information.

Once the change is determined to meet a threshold amount of change, an event to update business information (e.g., the name of the business, contact information, images, etc.) of the business can be generated. The event can be provided to an online directory of businesses or other provider of the content. Various other functions and advantages are described and suggested below as may be provided in accordance with the various embodiments.

FIG. 1 illustrates an example environment 100 for collecting images of points and/or objects at geographic locations that can be utilized in accordance with various embodiments. In this example, a system 102 for collecting images can be mounted, for example, on a vehicle 104. The vehicle may be an automobile, as illustrated, but may be of any other type apparent to one skilled in the art, such as a bicycle, bus, or airborne vehicle such as a manned or unmanned airplane. The image collection system, in this embodiment, includes at least one camera 106 (or other image capture sensor or element) operable to perform functions such as image and/or video capture. Each camera may be, for example, a charge-coupled device (CCD), a motion detection sensor, or an infrared sensor, or can utilize another appropriate image capturing technology. A GPS receiver 108, a range finder 110, a rate of travel monitor 112, and a rate of turn monitor 114 may also be included in the system and mounted on the vehicle 104.

In accordance with various embodiments, each of the camera 106, the GPS receiver 108, the range finder 110, the rate of travel monitor 112, and the rate of turn monitor 114 include or have access to a synchronized clock. The clocks may be separate clocks that are synchronized with each other or, alternatively, a single clock to which the camera, the GPS receiver 108, the range finder 110, the rate of travel monitor 112, and the rate of turn monitor 114 are coupled for time reference. A synchronized clock may thus mean one or more clocks from which each of multiple devices can receive synchronized time information. The camera, the GPS receiver 108, the range finder 110, the rate of travel monitor 112, and the rate of turn monitor 114 can be coupled to a computing device, such as a laptop computer. In some applications where the data storage capacity of the camera, the GPS receiver 108, the range finder 110, the rate of travel monitor 112, and the rate of turn monitor 114 is sufficiently large, the computing device need not be coupled to the camera, the GPS receiver 108, the range finder 110, the rate of travel monitor 112, and the rate of turn monitor 114 during image collection (e.g., while mounted on the vehicle 104).

The computing device includes a processor in communication with an input/output interface and a memory. The input/output interface enables the computing device to communicate with various input and output devices. Input devices may include the camera, the GPS receiver 108, the range finder 110, the rate of travel monitor 112, and the rate of turn monitor 114, as illustrated, plus any other computing elements that provide input signals to the computing device, such as a keyboard, mouse, external memory, disk drive, etc. Output devices may include typical output devices, such as a computer display, printer, facsimile machine, copy machine, etc. The processor is configured to operate in accordance with computer program instructions stored in a memory. Program instructions may also be embodied in a hardware format, such as one or more programmed digital signal processors. The memory may also be configured to store various data (e.g., image data, geographic location data, and speed data) collected and processed, as will be more fully described below. In some applications, the data obtained by the camera 106, the GPS receiver 108, and the range finder 110 (if provided) are sent directly to a hard drive of the computing device for storage, instead of being first stored in video tapes or removable disks. The computing device may include additional conventional components, such as a network interface, which are not illustrated herein for the purpose of clarity.

Once the camera 106, the GPS receiver 108, and perhaps the range finder 110, rate of travel monitor 112 and/or rate of turn monitor 112 are mounted on the vehicle 104, an operator drives the vehicle while automatically, or perhaps manually (with the aid of another operator), capturing a series of images of objects (e.g., building or store fronts) on each side of the street using the camera 106. In some applications, for example when the street width is sufficiently narrow or the street is relatively quiet, two cameras 106 may be mounted on the vehicle facing opposite directions so as to simultaneously take two series of images covering both sides of the street. In other applications, three or more cameras 106 may be mounted on the vehicle. For example, two or more cameras 106 may be mounted on the same side of the vehicle (for example, two on one side and two on the other side) to collectively obtain a stereoscopic image of each object being imaged. Any suitable auto-focus camera(s) 106 may be used, as will be apparent to one skilled in the art, though preferably the camera 106 would be a digital still camera or a digital video camera. If a digital still camera is used, the series of images taken will be still images. If a digital video camera is used, the series of images taken will be image frames that collectively form a video image. In any case, the camera 106 preferably time-stamps each image, i.e., records the time each image (or each image frame) is taken, in reference to a synchronized clock. Time-stamping is a standard feature of commercially available cameras.

As the camera 106 captures images of objects at geographic locations (e.g., businesses), the GPS receiver 108 records the geographic locations (e.g., longitude and latitude coordinates) while preferably time-stamping the recorded location data. The camera 106 and the GPS receiver 108 may be positioned or programmed relative to each other (e.g., by offsetting the distance therebetween) such that the geographic location determined by the GPS receiver 108 can be treated as that of the camera 106 itself. The rate of travel monitor 112, if used, records the rate of travel of the vehicle 104 as data is being collected while preferably time-stamping such information. As discussed below, the rate of travel information may be used to assist in filtering images or in determining the geographic coordinates of an image. Similarly, the rate of turn monitor 112, if used, records the degree of any turns made by the vehicle 104 as data is being collected while preferably time-stamping such information. For example, the rate of turn monitor 112 may be a gyroscope mounted on the vehicle 104, and the resistance incurred by the gyroscope during a turn may be used to calculate the degree of the turn made. Calculating and recording the degree of a turn may be used in conjunction with the rate of travel information recorded by the rate of travel monitor 112 to determine the geographic coordinates of an image of GPS data is not available.

The range finder 110, if used, records the distance to an object being viewed by the range finder 110 while preferably time-stamping such distance information. The range finder 110 may also be positioned or programmed relative to the camera 106 and the GPS receiver 108 such that the distance information determined by the range finder 110 can be treated as that of the camera 106. Any suitable GPS receiver and range finder may be used, as will be apparent to one skilled in the art.

The range finder 110 is useful in offsetting the distance between the GPS receiver 108 (geographically coinciding with the camera 106 and the range finder 110) and the object being imaged by the camera 106, so as to more accurately determine the precise geographic location of the object being imaged. Sometimes the vehicle 104 must travel on inclines. Since buildings are built perpendicular to the earth's gravitation, with the camera 106 being mounted level to the vehicle 104, the images captured by the camera 106 appear tilted. To overcome this problem, a gyroscope can be used with the camera 106 mounted on a gimbal. The gyroscope-based mounting system, in an embodiment of the present invention, may use the same gyroscope used to gather data for the rate of turn monitor 112. Alternatively, separate gyroscopes may be used. Another approach for solving the problem of images appearing tilted is to use a digital inclinometer to track an angle of the camera 106 relative to a level and then rotate the images in software during post-capture processing to compensate for the measured tilt-angles.

To collect images and geographic locations of numerous points and/or objects of interest, many vehicles may be used, each equipped with a camera and a GPS receiver. In order to efficiently collect images and geographic location data of businesses in remote or isolated areas, certain utility vehicles, such as U.S. Postal Service delivery vehicles or taxi cabs, may be requested to carry a data collection system as described herein. In various embodiments, the image data can be crowd-sourced, from social media websites, online image repositories, among other sources.

The camera 106 produces a set of time-stamped image data 118, the GPS receiver 108 produces a set of time-stamped geographic location data 120 (e.g., longitude and latitude coordinates), the range finder 110 produces a set of time-stamped distance information data 122, the rate of travel monitor 112 produces a set of time-stamped rate of travel information data 124, and the rate of turn monitor 112 produces a set of time-stamped rate of turn information data 126. These sets of data may be processed by a computing device on the system (or at least in communication with the system) to associate the sets of data with each other based on their respective time-stamps so as to associate each image with a geographic location of the object featured in the image, as indicated at block 128. The data processed by the computing device may occur continuously (e.g., at the same time as the data is collected by the camera 106, the GPS receiver 108, the range finder 110, and the rate of travel monitor 112) or in batches (e.g., after a certain volume of data is collected by the camera 106, the GPS receiver 108, the range finder 110, the rate of travel monitor 112, and the rate of turn monitor 112).

Alternative methods of associating image data with geographic locations can be utilized as is understood by those skilled in the art. For example, instead of relying on synchronization of the clocks of the respective devices, the devices may be coupled to each other so that, for example, image taking of the camera 106 instantaneously triggers the GPS receiver 108 and the range finder 110 to record the geographic location and the distance information at that location and the data are recorded together as a unit. Alternatively, geographic location recording of the GPS receiver 108 (or another controller triggered by the geographic location recording of the GPS receiver 108) triggers the camera 106 to take an image. For example, the longitude/latitude coordinates of selected businesses whose images are to be taken may be input to the GPS receiver 108 coupled to the camera 106. Each time the GPS receiver 108 determines it is located in front of a selected business, the GPS receiver 108 records the geographic location and triggers the camera 106 to record an image of the business. In this way, only those images capturing listed business locales will be taken. The foregoing description is not exhaustive and other methods for associating images with geographic locations may be used, as will be apparent to one skilled in the art. For example, in accordance with various embodiments, images can be associated with other information that can be used to determine a location of points and/or objects of interest. The information can include, e.g., GPS coordinates, navigation and orientation information derived from a compass, distance information of the computing device to the object and/or point of interest, height information of the object and/or point of interest to the computing device.

As indicated in block 130, the computing device correlates each image (already associated with a geographic location) with an address or other information indicating the locale by referring to a lookup table database 116 that stores addresses and/or locale information in correlation with their longitude and latitude coordinates, height, and other information. Alternatively, a suitable algorithm for deriving an address or locale based on a geographic location (e.g., longitude and latitude coordinates) may be used. After the series of images are correlated with addresses and/or locale information in block 130, the address/locale-correlated images may be provided to a content aggregation service 132. The content aggregation service can be in communication with an online directory which can use the information to display the listing together with an actual image of the address/locale in the listing. As described, in many situations, however, the information may be out of date, inaccurate, or not available at least in part because the content providers have not received updated information reflecting, for example, current location of business entities, notable scenes, and the like. Accordingly, the information can be updated by an update service or other such service.

Figure 2:
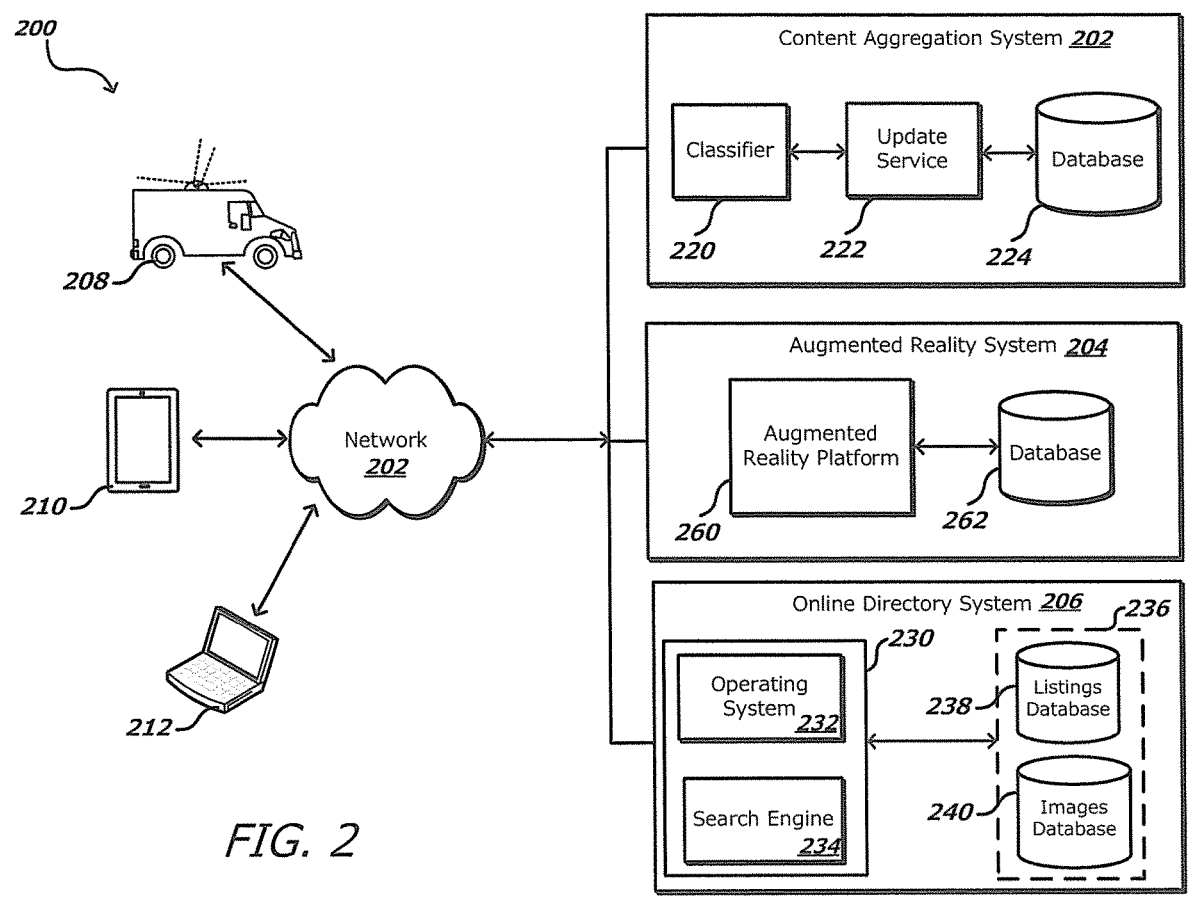
FIG. 2 illustrates an example environment for implementing an update service in accordance with various embodiments.

FIG. 2 illustrates an example environment 200 for implementing an update service in accordance with various embodiments. As described, address/locale-correlated images and other information may be published in a content aggregation system 202. In various embodiments, the content aggregation system provides a web service allowing users and other entities to obtain images and other content (e.g., reviews, menus, business information, etc.) that are associated with visual features at a point of interest in the real world. As is well understood in the art, various interfaces can be implemented to provide for access to content under the control of the content aggregation system. As shown in FIG. 2, the content aggregation system 202 provides access to content to client computing devices (208, 210, 212), an augmented reality system 204, and an online directory system 206. Although the content aggregation system, the augmented reality system, and the online directory system are illustrated as separate systems for purposes of explanation, it will be appreciated by those of ordinary skill in the art that the content aggregation system, the augmented reality system, and the online directory system could equally operate in a computer system having fewer or greater number of components than are illustrated.

Client computing devices (208, 210, and 212) can communicate with the various systems. In accordance with various embodiments, the client computing devices include, for example, computing devices mounted on vehicles 208, computing devices carried by people or other objects, etc. Although only some client computing devices are shown in FIG. 2, it should be understood that various other types of electronic or computing devices can be used. These client devices can include, for example desktop PCs, laptop computers, tablet computers, personal data assistants (PDAs), smart phones, portable media file players, e-book readers, portable computers, head-mounted displays, interactive kiosks, mobile phones, net books, single-board computers (SBCs), embedded computer systems, wearable computers (e.g., watches or glasses), gaming consoles, home-theater PCs (HTPCs), TVs, DVD players, digital cable boxes, digital video recorders (DVRs), computer systems capable of running a web-browser, or a combination of any two or more of these.

When communicating with the content aggregation service, the client computing devices can provide images and other information related to a point or object of interest. As described, the content aggregation system 202 can receive images of objects at geographic locations. A classifier component 220 can analyze the image data to determine, for example, visual features (e.g., feature points, feature descriptors, etc.), geolocation data, time stand data, and other data associated with the image data. An update service 222 can compare the determined information to corresponding stored information (if available). For example, image data received for a geographic location can be analyzed to determine visual features of a visual representation of the image data. A database can include stored visual features and other information associated with the geographic location. The update service can calculate a confidence score for each received image by matching the image against stored visual features. In the situation that the update service determines a confidence below a threshold confidence, an event can be triggered. The event can prompt an administrator to verify information associated with geographic location for which the image data is associated with. Additionally or alternatively, the update service can automatically modify any entries in the database. Modifying the entries can include, for example, adding or removing information. In some situations, in order to finalize the auto populated entries, an event can be triggered to have an administrated review the entries while in various embodiments review of the entries is not required.

In accordance with various embodiments, the classifier component can be part of an object recognition system configured to recognize points and/or objects of interest, determine visual features of those points and/or objects of interest, categorize points and/or objects of interest represented in image data, among other such functions. For example, the classifier component can extract from the image data a set of features of the representation of the points and/or objects of interest. The set of features can include at least one or more local features (e.g., ASG features, SIFT features, etc.). In some embodiments, these local features can be used to attempt to identify the object and/or point of interest but the object recognition system may not successfully recognize the object and/or point of interest based on the local features. As a result of unsuccessfully recognizing the object and/or point of interest based on local features, one or more non-local features (e.g., color, region-based, shape-based, 3D, global, composite features, etc.) can be extracted and the object recognition system can attempt to recognize the object and/or point of interest based on these non-local features. Alternatively, or in addition, the set of local features can be analyzed to determine that the object and/or point of interest has a number of local features below a local feature threshold or extracted feature values may be below threshold feature values. Such an approach can be characterized as "serial" in that the object recognition system includes an initial matching stage based on local features and a subsequent matching stage based on non-local features in the event of the failure of the initial matching stage. In other embodiments, the object recognition may operate in "parallel" and one or more processes can be executed to identify an object and/or point of interest based on local features and one or more separate processes can be executed to identify the object and/or point of interest based on non-local features. In systems using a parallel approach, the final output may be based on the process(es) recognizing the object of interest with highest confidence, the process(es) that complete the fastest (e.g., the first recognize the object of interest), a weighted combination of the processes wherein weighting is based on recognition confidence, a machine learned rule, or other heuristic. In these various embodiments, the object and/or point of interest is either not recognized based on local features or determined to be local feature-sparse and/or texture-limited. Upon determining that the object is not recognized based on local features or that the object is local feature-sparse, a machine learning algorithm can be applied to classify the object.

Examples of machine learning include principal component analysis (PCA), neural networks, support vector machines (SVM), inductive learning, adaptive boosting (Adaboost), deep learning, among others. In PCA, eigenvectors are computed on a training set of images known to include objects corresponding to a particular classification to determine the covariance matrix of the training set. Training images known to include the classified are projected onto "a classified object subspace" and clustered. The distance between a region of each training image known to include the classified object and the classified object subspace is computed for the training image. The distance from the classified object subspace is used as a measure of whether a query image includes a classified object, and the distances from the classified object subspace form a "classified object map." An object or point of interest can be detected to be presented in a query image from the local minima of the "classified object map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the autoassociative neural network, the probabilistic decision-based neural network (PDBNN), and the sparse network of winnows (SNoW). Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of object at multiple resolutions. At each scale, a training image is decomposed into subregions and the subregions are further decomposed according to space, frequency, and orientation. The statistics of each projected subregion are estimated from the projected samples to learn the joint distribution of object and position. An object is determined to be within an image if the likelihood ratio is greater than the ratio of prior probabilities.

Inductive learning approaches include decision tree or random forest learning. Decision tree learning uses a decision tree as a predictive model which maps observations about an object (e.g., class-labeled training data) to conclusions about the object's target value (e.g., classification). A decision tree, for example, is a flow-chart-like structure wherein each internal (i.e., non-leaf) node represents a test on an attribute, each branch denotes the outcome of the test, and each terminal (i.e., leaf) node represents a class label or classification. Decision-tree learning can be based on Iterative Dichotomiser 3 (ID3), C4.5, Classification and Regression Tree (CART), Chi-squared Automatic Interaction Detector (CHAID), Multivariate adaptive regression splines (MARS), among others. Random forest learning uses a number of decision trees to improve the classification rate.

AdaBoost is a machine learning boosting algorithm which finds a highly accurate hypothesis (i.e., low error rate) from a combination of many "weak" hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. Viola-Jones scans a sub-window of an input image using features consisting of Haar-like features, black and white boxlets that are weighted during training, and resized over several passes of the detector. A sub-window is determined to be a candidate of a classified object if the difference of the sum of pixels within two regions meets a threshold θ for a Haar-like feature determined during the training stage. Viola-Jones further utilizes the concept of attentional cascading which observes that within an image, most sub-windows are not instances of the classified object. Thus, smaller and more efficient classifiers can be used to reject sub-windows unlikely to be the classified object at earlier stages of the detector while keeping almost all of the positive instances. More complex classifiers are used at later stages to examine candidates that have not been rejected as candidates of the classified object.

Deep learning involves modeling high-level abstractions in data using multiple non-linear transformations. Deep learning techniques are based on the premise that images can be represented in many ways but, from exemplars, certain representations can make it easier to learn tasks of interest, such as object classification of an object represented in an image. Deep learning techniques include deep neural networks, convolutional deep neural networks, and deep belief networks. As discussed, in addition to the object classification stage, machine learning techniques can also be implemented be at other stages of the object recognition pipeline, including image segmentation (e.g., separating the query object from the background and other objects or classification of pixels as boundary pixels), image matching (e.g., selecting a subset of similarity measures that best determines matches), global feature extraction (e.g., predicting high-level attributes which can be leveraged for multi-modal approaches for object classification), and/or vocabulary building, among other stages.

After the object and/or point of interest has been classified, extracted query features and the extracted features of database objects corresponding to the classification can be compared to determine matches. In some embodiments, each type of feature may have its own matching criterion to determine correspondences. As an example, dot products can be used for texture ASG features. Other similarity/distance measures include the Euclidean distance, Minkowski distance, Mahalanobis distance, quadratic form distance, Kullback-Leibler divergence, Jeffrey divergence, Hausdorff distance, Mallows distance, earth mover's distance, the integrated region matching distance, among others. As another example, some features can use a similarity measure based on a machine learned rule. From among the putative matches, at least one database object and/or point of interest can be determined to match the query object and/or point of interest based on a verification algorithm, such as RANSAC or a variation thereof.

In some embodiments, each type of feature may have its own version of RANSAC. These algorithms can be progressive and adaptive to eliminate putative correspondences caused by background noise. Further, knowledge of the classification of the object can be used to weight certain types of features more heavily with respect to other types of features. In some embodiments, the output from the execution of the particularized version of RANSAC for each type of feature can be aggregated to determine the final matching database objects.

After at least one database object and/or point of interest has been determined to match the query object and/or point of interest represented in the query image, identifying information, metadata, or other information corresponding to the database object and/or point of interest can be provided to the object service. In accordance with various embodiments, the updated information stored in database 224 can be provided to a number of different systems, as may include an augmented reality system 204 and an online directory system 206.

As shown in FIG. 2, the client computing devices (208, 210, 212) communicate with the online directory system 206 via wired or wireless connections to one or more computer networks, such as the Internet 202. Protocols and components for communicating via the Internet are well known to those of ordinary skill in the art of computer network communications. The client computing devices requests and retrieves information from the online directory system 206 via a Web browser application or other application that provides the user with a graphical user interface to the Internet, as is also well known to those of ordinary skill in the art.

The online directory system 206 can operate in a distributed computing environment comprising several computer systems that are interconnected via communication links, e.g., using one or more computer networks or direct connections. However, it will be appreciated by those of ordinary skill in the art that the online directory system 206 could equally operate in a computer system having fewer or greater number of components than are illustrated. Thus, the description of the online directory system 206 should be taken as exemplary and not limiting to the scope of the invention. In particular, the online directory system 206 may comprise plural subsystems, each for performing a specific function in response to a request from a client computing device.

The online directory system 206 as illustrated includes both a server 230 having an operating system 232 and a search engine 234, and a database server 236 having a listings database 238 and an images database 240. The online directory system 206, in this example, is a Web page server that supports an online directory site on which each listing (e.g., business) can be displayed together with an image correlated with the listing. The online directory server 230 communicates text and graphics organized as a Web page using, for example, hypertext transfer protocols, in response to requests and search queries received from the client computing devices. The online directory server 230 also conducts searches of the databases 238 and 240 in the database server 236. The administration and overall operation of the online directory server 230 is controlled by its operating system 232, while its search function is performed by the search engine 234 in cooperation with the database server 236.

The database server 236 maintains the listings database 238 and the images database 240 that the online directory server 230 uses to respond to user requests and search queries. The listings database 238 contains information generally found in conventional online directories in a searchable form, i.e., numerous listings (business names together with their addresses/locale, phone numbers, business type, etc.) searchable by their business names, addresses/locale, phone numbers, business types, etc. The listings database 238 may also contain information such as the business hours, a brief description or profile, customer reviews, etc., of each business listed. The images database 240 contains digitized images of the businesses in correlation with the business addresses/locale stored in the listings database 238. The database server 236 is configured to receive search instructions from the search engine 234 and return search results from the listings database 238 and the images database 240. Those of ordinary skill in the art will recognize that the online directory server 230 and the database server 236 will each typically employ a memory and main processor in which program instructions are stored and executed for operation of the servers. The online directory system 206 enables a user to search and view online directories in which each listing (e.g., business) is displayed with a representative image of an object (e.g., business building) taken at the geographic location of the business. Additionally, the online directory may also include a street map identifying the location of each listing. For example, a user can perform a search for information in a particular geographic location. The search can include a text-based search where a user inputs text in an appropriate field of an application, or an image-based search where the user captures image data (still images and/or video) of an object and/or point of interest. The image data as well as other data (e.g., metadata) can be received at the online directory. The metadata, which can include geolocation data, device orientation data, and other inertial and positioning data, can be used to determine a subset of images and/or information to search against. The captured image data can be analyzed in accordance with various embodiments described herein, and the visual features determined from the analysis and other information can be compared to the subset of images and/or information. Determining the subset of images and/or information can advantageously allow for faster search time and reduced processing. The online directory, based on the comparison, can provide a set of listings that includes information for objects and/or points of interest.

As described, the updated information stored in database 224 can be provided to an augmented reality system 204. In the context of augmented reality, an image of an object and/or point of interest (e.g., person, place, etc.) can be captured in a substantially real-time manner using a camera of a mobile computing device. Using an appropriate application executing on a computing device, a user is able to obtain an image of the point of interest or object by positioning the mobile computing device such that the point of interest or object is within a field of view of at least one camera of the mobile computing device. The image data can be received at the augmented reality system 204. The image data can be associated with additional information as may include at least one of a current location identifier or a timestamp. The current location identifier can include information associated with, for example, Global Positioning System (GPS) locations, Inertial Measurement Unit (IMU) orientations, compass data of the computing device. The timestamp can include information such as a date and time of capturing the image data. In accordance with various embodiments, the additional information can be used to determine a subset of information to which to search, and the image data can be used to further narrow that search to more precisely determine what the user is looking for, as will be described further herein.

In this example, the augmented reality system 204 includes an augmented reality platform 260 that communicates with the client computing devices via the network 202. The augmented reality platform 260 can provide a web service allowing users to search and discover links and other content (e.g., reviews, menus, video, chat walls, contact information, URLs) that are tied to unique visual features at a point of interest in the real world. The client computing devices can display those links and content as augmented reality content on the display screen or the camera preview screen. On the production side, the augmented reality system 204 enables users or an owner of point of interest to submit or upload links and/or contents related to the point of interest to the database 262. The links and/or contents are tied to at least one of the point of view (e.g., GPS location, IMU orientation, and compass) from the client computing device, or image features of the point of interest. On the consumption side, users in the real world can discover the links and/or content related to the point of interest by pointing the client computing device at the point of interest. The links and/or content related to the point of interest can be presented as content augmenting a camera preview of the real world.

For example, as a user moves along in the real world, the augmented reality system 204 can recognize and match features in the real-time image against images that are associated with the points and/or objects of interest in the vicinity of the client computing device or within the point of view of the user. For example, image data of a point or object of interest captured by a camera of a computing device operated by a user can be received at the augmented reality platform. The image data can include at least one visual feature. Information representative of the visual feature can be determined based at least in part on the image data. Tracking information associated with the visual feature can be received. The tracking information can be matched to stored information based at least in part on position information and orientation information associated with the camera at a time of capturing the image data, wherein the stored information can correspond to a one or more items used to determine an item matching to the visual feature. Content associated with the item matched to the visual feature can be retrieved and provided for display with the image data on the client computing device. The content can be rendered in an overlay element that overlays the image data displayed on the computing device. The content can include, for example, user-selectable elements or other visual content elements that can be selected by the user or otherwise viewed, the content elements including at least one of a button or a hyperlink, for example. In this way, the overlay element can augment the image data by overlaying the content, wherein the overlay element is selected from one of a box, a button, a three-dimensional (3D) structure, an animation, audio, video, Web page, or interactive user interface.

Figure 3:
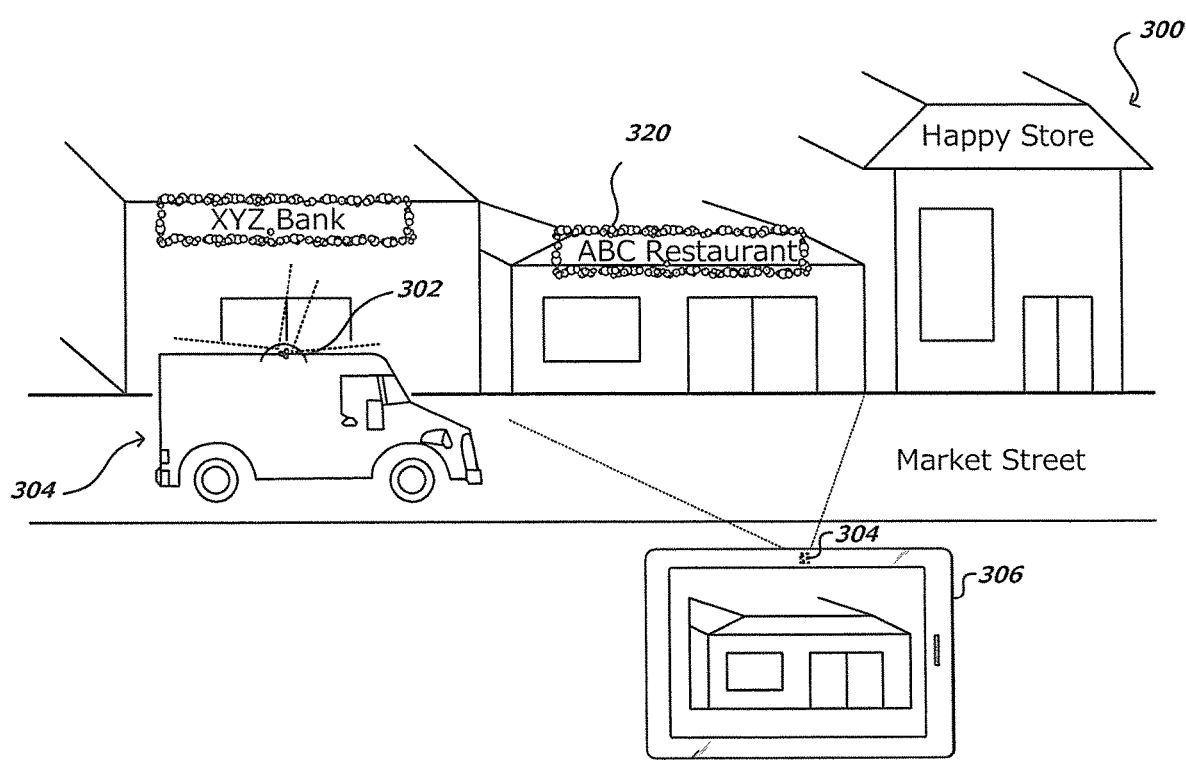
FIG. 3 illustrates an example situation of an environment for providing information utilized by an update service in accordance with various embodiments.

As described, the information provided by the client devices can be utilized by the update service 222 to update or generate entries in database 224 of the content aggregation system. FIG. 3 illustrates an example environment 300 for providing information that is utilized by the update service (e.g., update service 222 of FIG. 2) in accordance with various embodiments. As shown in FIG. 3, the image data is obtained from a camera 302 mounted on a vehicle 304 and a camera 306 of a computing device 308. The update service can, for example, receive image data captured by the camera 302 mounted on the vehicle 304 and the camera 306 of the computing device 308. For example, a user of the computing device 306 is shown moving down a street, for example, Market Street, while attempting to experience an augmented reality by viewing additional content overlaid on a display of captured image data. In this example, the user desires to obtain relevant information about the ABC Restaurant 320 using the computing device 306. The user can direct one or more image capture elements located on the computing device to capture a live view of at least a portion of the ABC Restaurant 320. The ABC Restaurant 320 may be recognized by analyzing and comparing the captured image(s) or feature(s) with stored images related to the place in a database. In accordance with various embodiments, many embodiments provide image processing algorithms and recognition techniques to recognize a point of interest by matching the feature(s) or image of the point of interest against saved images in a database. For example, optical character recognition (OCR) can be used as a primary image analysis technique or to enhance other processes. Features (e.g., shape, size, color and text) of the point of interest can be extracted and matched against points and/or objects of interest determined in the vicinity of the user's location. In some embodiments, image processing processes may include sub-processes such as, for example, thresholding (converting a grayscale image to black and white, or using separation based on a grayscale value), segmentation, blob extraction, pattern recognition, barcode and data matrix code reading, gauging (measuring object dimensions), positioning, edge detection, color analysis, filtering (e.g. morphological filtering) and template matching (finding, matching, and/or counting specific patterns). It should be noted that various other techniques (e.g., OCR and other text recognition processes) can be used as the primary image analysis technique or to enhance other processes as are known in the art.

During the image matching processing an update service can receive the image data and attempt to quickly verify the restaurant as may include information associated with the restaurant. The image data can be analyzed to determine visual features of a visual representation of the restaurant 320. The visual features can be compared to information stored in a database or other storage device. A change in the visual representation of the restaurant can be determined. The change might be due to, for example, a change in the restaurant operating at that location for example because the previous restaurant went out of business and a different business has since opened, a change in the visual appearance of the restaurant for example because the restaurant is decorated for a special event or seasonal offerings, an update to restaurant hours, an update to contact information, or an update to other information. Once the change is detected, an event to update restaurant information of the restaurant can be generated. The event can be provided to an online directory of businesses or other provider of the content.

In accordance with an embodiment, the camera 302 mounted on the vehicle 304 can be used to obtain image data that is received by the update service. The vehicle can be any one of a number of vehicles, as may include delivery vehicles (e.g., cars, trucks, vans, unmanned aerial vehicles), taxis, police, emergency response, and various other private and public vehicles alike. The image data can be received at a content aggregation system. The content aggregation system can include a classifier service and the update service. The classifier service can analyze the image data to determine, for example, visual features, geolocation data, time stand data, and other data associated with the image data. The update service can compare the determined information to corresponding stored information (if available). For example, image data received for a geographic location by camera 302 can be analyzed to determine visual features of a visual representation of the image data. A database can include stored visual features and other information associated with the geographic location. In this example, with XYZ Bank. The update service can calculate a confidence score for each received image by matching the image against stored visual features. In the situation that the update service determines a confidence below a threshold confidence, an event can be triggered. The event can prompt an administrator to verify information associated with geographic location for which the image data is associated with. In this example, the administrator may need to update business information (e.g., hours of operation, location, contact information, etc.) associated with XYZ Bank.

Figure 4:
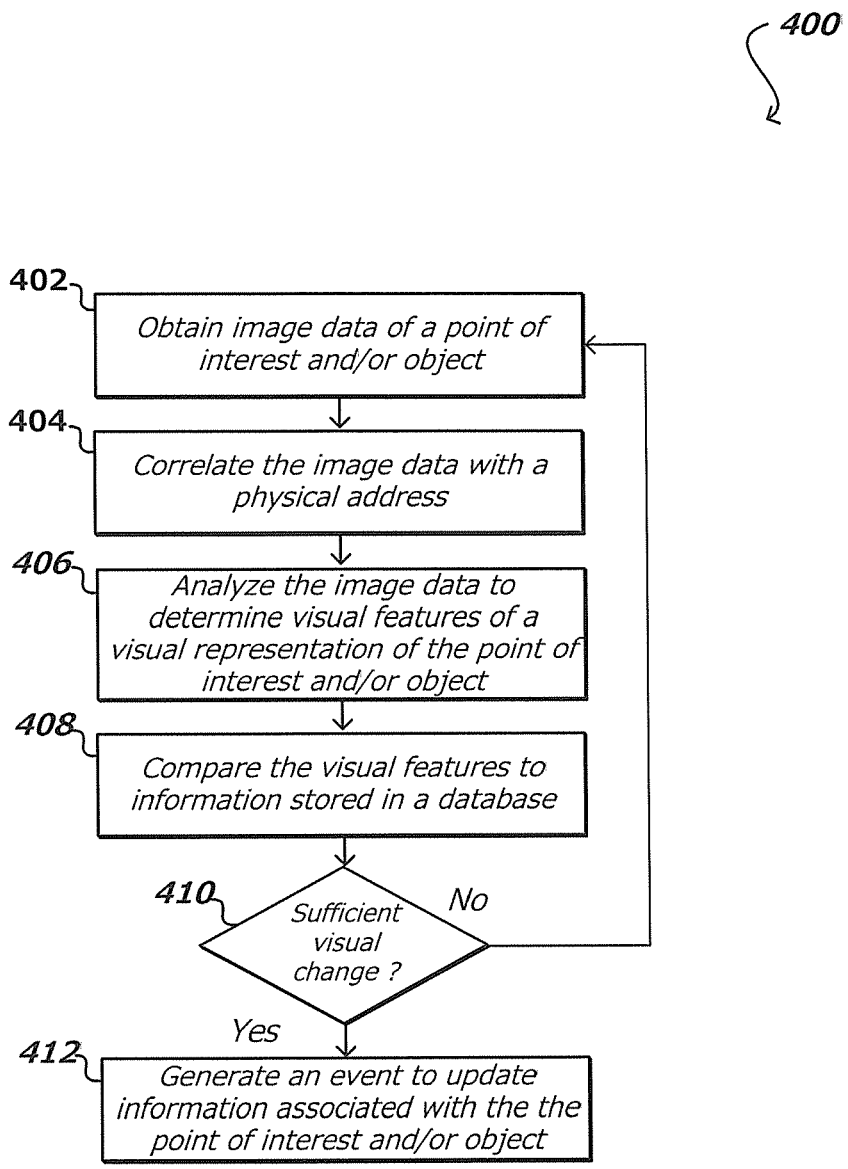
FIG. 4 illustrates an example process for determining information that is utilized by an update service in accordance with various embodiments.

FIG. 4 illustrates an example process 400 for determining information that is utilized by an update service in accordance with various embodiments. In accordance with various embodiments, an update service can obtain 402 image data of a point of interest and/or object from any number of sources. The sources can include electronic devices (e.g., mobile phones, wearable devices, motor vehicles, unmanned aerial vehicles, etc.), social media directories, crowd-sourced image data, etc. The update service can analyze the image data to determine whether there has been a change to the point of interest and/or object represented in the image data. For example, the image data can include a representation of a business or other such entity as well as be associated with metadata data that includes geographic coordinates corresponding to where the image data was obtained. Using the geographic coordinates, the image data can be correlated 404 with a physical address and/or locale. The image data can be analyzed 406 to determine visual features of a visual representation of the point of interest and/or object. As will be described further herein, one such image analysis approach can utilize deep learning as used in localization pipelines for image recognition. The visual features can include, for example, text or images on the exterior of the business, the design of the business, as well as any aspects of the interior of the business represented in the image data.

The visual features can be compared 408 to information stored in a database or other storage device. The information stored in the database can be derived from previously obtained image data that includes visual features corresponding to the business. In the situation where there is a match, the update service determines 410 whether a change in the visual representation meets a threshold amount of change in the visual representation of the business. The change might be due to, for example, a change in the business operating at that location which can result in a change in the visual appearance of the business; an update to business hours, contact information, or other information. In the situation where the change meets the threshold amount of change, an event to update business information (e.g., the name of the business, contact information, images, etc.) can be generated 412. The event can prompt an administrator to verify information associated with geographic location for which the image data is associated with. Additionally or alternatively, the update service can automatically modify any entries in the database. Modifying the entries can include, for example, adding or removing information. In some situations, in order to finalize the auto populated entries, an event can be triggered to have an administrated review the entries while in various embodiments review of the entries is not required. In the situation where the change does not meet the threshold amount of change, the process can repeat.

Accordingly, approaches in accordance with various embodiments improve the operation and performance of the computing device(s) on which they are implemented and with which they communicate wirelessly by, among other advantages, maximizing efficiency of these computing devices by adaptively managing information as may include updating information, providing information, and utilizing information. Embodiments provide for efficiently generating and distributing updated information to a number of different systems. As described, embodiments provide for determining a category (e.g., restaurant, salon, museum, etc.) of various points and/or objects of interest along three potential axes: business type; facade type; facade detail type, and using this category information or other information (e.g., visual information) to efficiently update information about those points and/or objects of interest.

For example, the update service could categorize a business as a cafe, a salon, or a clothing store. If the business is categorized as a restaurant and previous information categorizes the business as a salon, an event can be triggered to review and update information for that business. This type of processing can drive other processes, saving human annotation and drastically reducing the delay in processing. Further, the facade could be categorized as windowed, painted, obscured, or open. Determining the facade type allows for segmenting the facade better for visual matching algorithms such as image match. Further still, facade detail types could be seasonal, holiday, or standard, providing an idea of when to update business information as may include images and the like, and whether the business is likely to go back to what it was before or something new.

Various approaches can be extended to other services, such as mapping services, navigation services, urban/city planning systems, etc. For example, approaches described herein can be used to efficiently determine updates in traffic and/or road conditions, which can be provided to mapping and navigation systems, as well as law enforcement and protection services. In one example, image data of driving conditions, road work, road conditions, etc. can be obtained, categorized, and provided to interested services. In another example, urban and city planners can quickly receive real-time updates on the number of businesses, updates to the type of businesses, etc., and that information can be used for planning and other purposes.

Figures 5A, 5B:
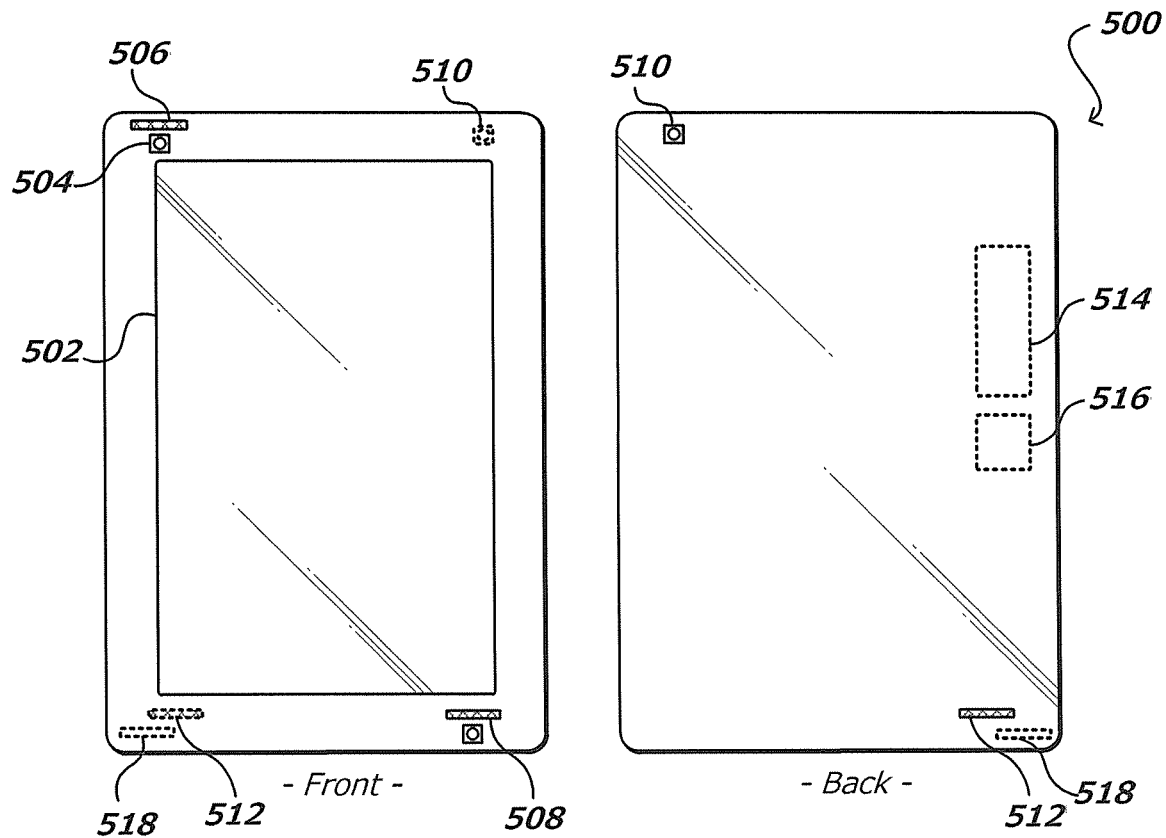
FIGS. 5A and 5B illustrate an example computing device that can be used in accordance with various embodiments.

FIGS. 5A and 5B illustrate front and back views, respectively, of an example electronic computing device 500 that can be used in accordance with various embodiments. Although a portable computing device (e.g., a smartphone, an electronic book reader, or tablet computer) is shown, it should be understood that any device capable of receiving and processing input can be used in accordance with various embodiments discussed herein. The devices can include, for example, desktop computers, notebook computers, electronic book readers, personal data assistants, cellular phones, video gaming consoles or controllers, television set top boxes, and portable media players, among others.

In this example, the computing device 500 has a display screen 502 (e.g., an LCD element) operable to display information or image content to one or more users or viewers of the device. The display screen of some embodiments displays information to the viewers facing the display screen (e.g., on the same side of the computing device as the display screen). The computing device in this example can include one or more imaging elements, in this example including two image capture elements 504 on the front of the device and at least one image capture element 510 on the back of the device. It should be understood, however, that image capture elements could also, or alternatively, be placed on the sides or corners of the device, and that there can be any appropriate number of capture elements of similar or different types. Each image capture element 504 and 510 may be, for example, a camera, a charge-coupled device (CCD), a motion detection sensor or an infrared sensor, or other image capturing technology.

As discussed, the device can use the images (e.g., still or video) captured from the imaging elements 504 and 510 to generate a three-dimensional simulation of the surrounding environment (e.g., a virtual reality of the surrounding environment for display on the display element of the device). Further, the device can utilize outputs from at least one of the image capture elements 504 and 510 to assist in determining the location and/or orientation of a user and in recognizing nearby persons, objects, or locations. For example, if the user is holding the device, the captured image information can be analyzed (e.g., using mapping information about a particular area) to determine the approximate location and/or orientation of the user. The captured image information may also be analyzed to recognize nearby persons, objects, or locations (e.g., by matching parameters or elements from the mapping information).

The computing device can also include at least one microphone or other audio capture elements capable of capturing audio data, such as words spoken by a user of the device, music being hummed by a person near the device, or audio being generated by a nearby speaker or other such component, although audio elements are not required in at least some devices. In this example there are three microphones, one microphone 508 on the front side, one microphone 512 on the back, and one microphone 506 on or near a top or side of the device. In some devices there may be only one microphone, while in other devices there might be at least one microphone on each side and/or corner of the device, or in other appropriate locations.

The device 500 in this example also includes one or more orientation- or position-determining elements 518 operable to provide information such as a position, direction, motion, or orientation of the device. These elements can include, for example, accelerometers, inertial sensors, or electronic gyroscopes operable to detect movement (e.g., rotational movement, angular displacement, tilt, position, orientation, motion along a non-linear path, etc.) of the device 500. An orientation determining element can also include an electronic or digital compass, which can indicate a direction (e.g., north or south) in which the device is determined to be pointing (e.g., with respect to a primary axis or other such aspect).

The example device also includes at least one computing mechanism 514, such as may include at least one wired or wireless component operable to communicate with one or more electronic devices. The device also includes a power system 516, such as may include a battery operable to be recharged through conventional plug-in approaches, or through other approaches such as capacitive charging through proximity with a power mat or other such device. Various other elements and/or combinations are possible as well within the scope of various embodiments.

Figure 6:
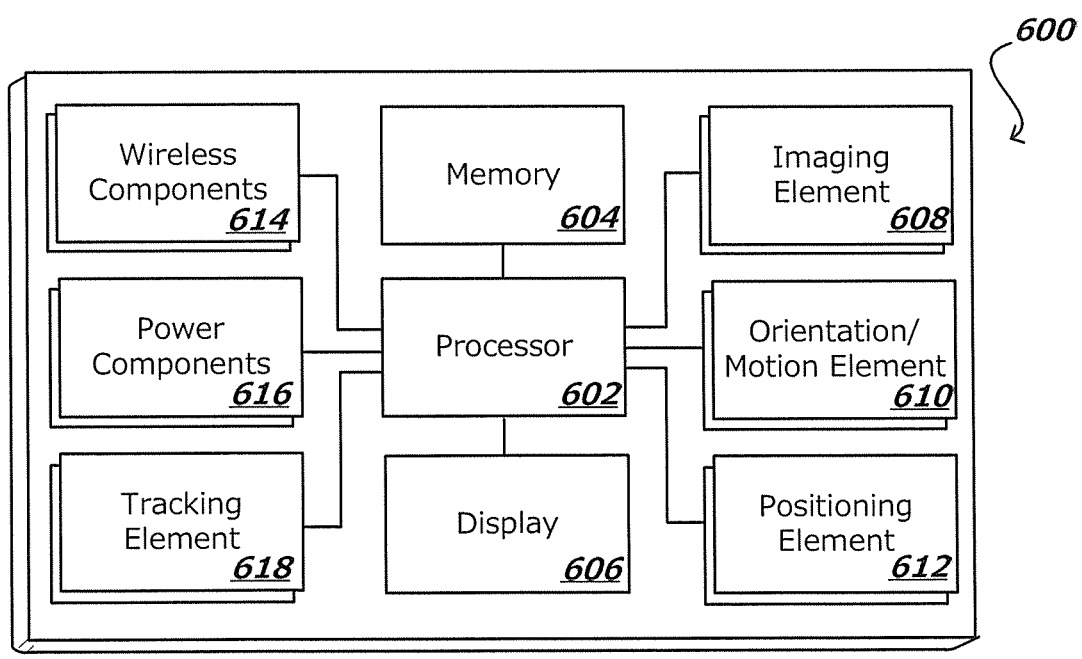
FIG. 6 illustrates an example set of basic components of a computing device, such as the device described with respect to FIGS. 5A and 5B.

FIG. 6 illustrates a set of basic components of an electronic computing device 600 such as the device 500 described with respect to FIGS. 5A and 5B. In this example, the device includes at least one processing unit 602 for executing instructions that can be stored in a memory device or element 604. As would be apparent to one of ordinary skill in the art, the device can include many types of memory, data storage, or computer-readable media, such as a first data storage for program instructions for execution by the processing unit(s) 602, the same or separate storage can be used for images or data, a removable memory can be available for sharing information with other devices, and any number of computing approaches can be available for sharing with other devices.

The device typically will include some type of display element 606, such as a touch screen, electronic ink (e-ink), organic light emitting diode (OLED) or liquid crystal display (LCD), although devices such as portable media players might convey information via other means, such as through audio speakers.

As discussed, the device in many embodiments will include at least one imaging element 608, such as one or more cameras that are able to capture images of the surrounding environment and that are able to image a user, people, or objects in the vicinity of the device. The image capture element can include any appropriate technology, such as a CCD image capture element having a sufficient resolution, focal range, and viewable area to capture an image of the user when the user is operating the device. Methods for capturing images using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device.

The example computing device 600 also includes at least one orientation determining element 610 able to determine and/or detect orientation and/or movement of the device. Such an element can include, for example, an accelerometer or gyroscope operable to detect movement (e.g., rotational movement, angular displacement, tilt, position, orientation, motion along a non-linear path, etc.) of the device 600. An orientation determining element can also include an electronic or digital compass, which can indicate a direction (e.g., north or south) in which the device is determined to be pointing (e.g., with respect to a primary axis or other such aspect).

As discussed, the device in many embodiments will include at least a positioning element 612 for determining a location of the device (or the user of the device). A positioning element can include or comprise a GPS or similar location-determining elements operable to determine relative coordinates for a position of the device. As mentioned above, positioning elements may include wireless access points, base stations, etc. that may either broadcast location information or enable triangulation of signals to determine the location of the device. Other positioning elements may include QR codes, barcodes, RFID tags, NFC tags, etc. that enable the device to detect and receive location information or identifiers that enable the device to obtain the location information (e.g., by mapping the identifiers to a corresponding location). Various embodiments can include one or more such elements in any appropriate combination.

As mentioned above, some embodiments use the element(s) to track the location of a device. Upon determining an initial position of a device (e.g., using GPS), the device of some embodiments may keep track of the location of the device by using the element(s), or in some instances, by using the orientation determining element(s) as mentioned above, or a combination thereof. As should be understood, the algorithms or mechanisms used for determining a position and/or orientation can depend at least in part upon the selection of elements available to the device.

The example device also includes one or more wireless components 614 operable to communicate with one or more electronic devices within a computing range of the particular wireless channel. The wireless channel can be any appropriate channel used to enable devices to communicate wirelessly, such as Bluetooth, cellular, NFC, or Wi-Fi channels. It should be understood that the device can have one or more conventional wired communications connections as known in the art.

The example device also includes a tracking element 618 operable performing functions such as receiving image data of a point of interest captured by a camera of a computing device operated by a user, the image data including a visual feature; determining information representative of the visual feature based at least in part on the image data; receiving tracking information associated with the visual feature; determine that the tracking information is within a tracking threshold; matching the information to stored information based at least in part on position information and orientation information associated with the camera at a time of capturing the image data, the stored information corresponding to a one or more items used to determine an item matching to the visual feature; retrieving content associated with the item matched to the visual feature; providing the content for display with the image data on the computing device; and cause the content to be rendered in an overlay element that overlays the image data displayed on the computing device.

The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. These I/O devices could even be connected by a wireless infrared or Bluetooth or other link as well in some embodiments. Some devices also can include a microphone or other audio capture element that accepts voice or other audio commands. For example, a device might not include any buttons at all, but might be controlled only through a combination of visual and audio commands, such that a user can control the device without having to be in contact with the device.

Figure 7:
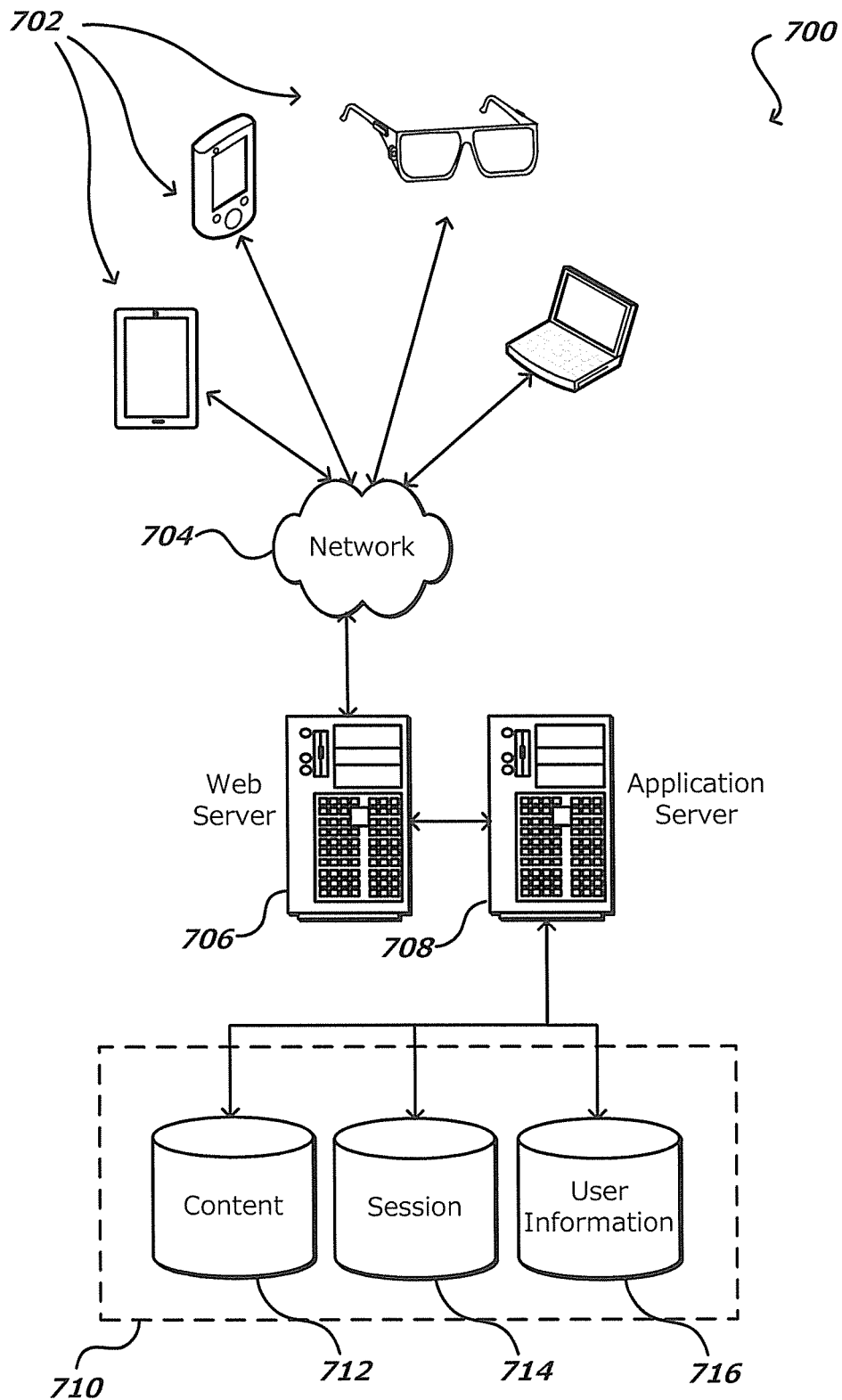
FIG. 7 illustrates an environment in which various embodiments can be implemented in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Computing over the network can be enabled via wired or wireless connections and combinations thereof. In this example, the network includes the Internet, as the environment includes a Web server 706 for receiving requests and serving content in response thereto, although for other networks, an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 708 can include any appropriate hardware and software for integrating with the data store 710 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 706 in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing content (e.g., production data) 712 and user information 716, which can be used to serve content for the production side. The data store is also shown to include a mechanism for storing log or session data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via computing links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracles®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN"). Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and other non-transitory computer readable media for containing code, or portions of code, can include any appropriate storage media used in the art, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing system, comprising:
   a computing device processor;
   a memory device including instructions that, when executed by the computing device processor, cause the computing system to:
   receive first image data captured by a camera mounted on a vehicle, the first image data including a representation of a first business entity and being associated with geographic coordinates corresponding to where the image data was captured;
   correlate the first image data with a locale based at least in part on the geographic coordinates;
   analyze the first image data to identify visual features of a visual representation of the first business entity, the visual features corresponding to a façade of the first business entity including physical features of a building area of the first business entity;
   assign, based at least in part on the identified visual features, the first business entity to a category representative of a service associated with the first business entity;
   compare the visual features to stored information to determine a change in the visual representation of the first business entity, based at least in part on a difference between the physical features of the building area, the stored information comprising at least second business information associated with a second business entity at the geographic coordinates, the second business information being different than the first business information;

determine that the difference between the visual features corresponds to a temporary change;

compare the category of the first business entity to the stored information to determine a change in an assigned category of the second business entity; and generate an event to update the second business information to first business information of the first business entity for presentation in an online directory of businesses, in response to determining a change in at least one of the visual representation or the assigned category.

2. The computing system of claim 1, wherein the instructions when executed further enable the computing system to:

receive a search request for the business entity, the search request including the geographic coordinates;

determine, based at least in part on the geographic coordinates, a geographic area for which the search is to be performed;

identify a listing corresponding to the search request, wherein the listing is associated with a location in the geographic area;

cause interactive information representative of the identified listing to be displayed;

receive an indication that the listing does not include the business entity; and generate an event to provide business information of the business entity.

3. The computing system of claim 1, wherein the instructions, when executed further enable the computing system to:

receive second image data that includes a representation of the business entity from a computing device;

analyze the second image data to identify the business entity;

retrieve content associated with the business entity; and provide the content to the computing device, wherein the content includes at least one of promotional coupons, menus, advertisements, reservation systems, floor plans, videos, customer reviews, wait time, daily specials, recommendations of items offered by the business entity, or related business entities.

4. The computing system of claim 1, wherein the information is derived from image data obtained from at least one of a camera of a user of an online directory, a camera of a user of a social media website, a camera coupled to an unmanned aerial vehicle, or a camera coupled to a wearable computing device.

5. A computing system, comprising:

a computing device processor; and a memory device including instructions that, when executed by the computing device processor, cause the computing device to:

receive first image data, from a camera mounted on a vehicle; the first image data including a representation of a first entity and being associated with metadata to identify the first entity;

correlate the first image data with stored identification information associated with the first entity based at least in part on the metadata;

analyze the first image data to identify visual features of a visual representation of the first entity, the visual features corresponding to a façade of the first entity including physical features of a building area of the first entity;

assign, based at least in part on the identified visual features, the first entity to a category representative of a service associated with the first entity;

compare the visual features to stored information, comprising at least second business information of a second entity, to determine a change in the visual representation of the second entity, based at least in part on a difference between the physical features of the building area;

determine that the difference between the visual features corresponds to a temporary change;

compare the category of the first entity to the stored information to determine a change in an assigned category of the second entity; and generate an event to update entity descriptions of the second entity in an online directory of entities to correspond to business information of the first entity, in response to determining a change in at least one of the visual representation or the assigned category.

6. The computing device of claim 5, wherein the entity includes at least one of a business entity, a landmark, a residential entity, a historical scene, or a notable scene; and wherein the metadata includes at least one of a keyword, a caption, a title, comments, geographic coordinates, or information used to catalog the first image data.

7. The computing device of claim 5, wherein the instructions when executed further enable the computing system to:

obtain a plurality of images, each image of the plurality of images including a view of the entity for a particular capture direction;

correlate the plurality of images with an address associated with the entity; and store the plurality of images as stored information.

8. The computing device of claim 5, wherein the instructions when executed further enable the computing system to:

receive second image data, the second image data including a representation of at least a portion of the entity and being associated with geographic coordinates;

correlate the second image data with a locale based at least in part on the geographic coordinates;

analyze the second image data to determine the category associated with the entity;

determine a dataset representative of a geographic area for which a search is to be performed based at least in part on the geographic coordinates; and identify a listing corresponding to the search, wherein the listing is associated with a location in the geographic area and the category.

9. The computing device of claim 8, wherein the instructions when executed further enable the computing system to:

cause interactive information representative of the identified listing to be displayed;

receive an indication that the listing does not include the entity; and generate an event to provide business information of the entity.

10. The computing device of claim 8, wherein the instructions when executed to analyze the second image data further enable the computing system to:

identify information corresponding to at least one of text associated with the entity, visual features of a visual representation of the entity, or graphics associated with the entity; and compare the information with stored information to determine the category of the entity, wherein the category is one of a restaurant, a bar, a bookstore, a grocery store, or a clothing store.

11. The computing device of claim 5, wherein the instructions when executed further enable the computing system to:
receive second image data form a computing device that includes a representation of the entity;
analyze the second image data to identify the entity;
retrieve content associated with the entity; and
provide the content to the computing device, wherein the content includes at least one of promotional coupons, menus, advertisements, reservation systems, floor plans, videos, customer reviews, wait time, daily specials, recommendations of items offered by the entity, or related entities.

12. The computing device of claim 5, wherein the instructions when executed further enable the computing system to:
receive, from the camera and a global positioning system (GPS) mounted on a vehicle, time information from a synchronized clock;
receive images of objects at geographic locations captured by the camera and recording geographic locations as determined by the GPS, wherein each image and each determination of geographic location is time-stamped by the synchronized clock;
associate each image with a geographic location based on corresponding respective time-stamps; and
correlate each image with a locale based on each image's associated geographic location, wherein one or more images are correlated with each local.

13. The computing device of claim 5, wherein the instructions when executed further enable the computing system to:
receive a search request;
determine a dataset representative of a geographic area for which the search is to be performed;
cause a map representative of at least a portion of the geographic area to be displayed;
identify a listing corresponding to the search request, wherein the listing is associated with a location within the geographic area;
cause interactive information representative of the identified listing to be displayed with the map; and
cause an interactive position identifier associated with the identified listing to be displayed on the map.

14. The computing device of claim 5, wherein the instructions when executed further enable the computing system to:
receive a search request for the entity, the search request including geographic coordinates;
determine, based at least in part on the geographic coordinates, a geographic area for which the search is to be performed;
identify a listing or entities corresponding to the search request, wherein the listing is associated with the geographic area;
identify a plurality of potential images corresponding to the entity;
provide for display the plurality of potential images in the listing; and
enable user input indicating one of the plurality of potential images as being a visual representation of the entity.

15. The computing device of claim 14, wherein the instructions when executed further enable the computing system to:
store the user input in an online directory of entities.

16. A method, comprising:
receiving first image data from a camera mounted on a vehicle, the first image data including a representation of a first entity and being associated with metadata to identify the first entity;
correlating the first image data with stored identification information associated with the first entity based at least in part on the metadata;
analyzing the first image data to identify visual features of a visual representation of the first entity, the visual features corresponding to a façade of the first entity including physical features of a building area of the first entity;
assigning, based at least in part on the identified visual features, the first entity to a category representative of a service associated with the first entity;
comparing the visual features to stored information to determine a change in the visual representation of the entity, based at least in part on a difference between the physical features of the building area;
determining that the difference between the visual features corresponds to a temporary change;
comparing the category of the entity to the stored information, comprising at least second business information of a second entity, to determine a change in an assigned category of the second entity; and
generating an event to update entity descriptions of the second entity in an online directory of entities to correspond to business information of the first entity, in response to determining a change in at least one of the visual representation or the assigned category.

17. The method of claim 16, further including:
obtaining a plurality of images, each image of the plurality of images including a view of the entity for a particular capture direction;
correlating the plurality of images with a locale associated with the entity; and
storing the plurality of images as stored information.

18. The method of claim 16, further comprising:
receiving second image data, the second image data including a representation of at least a portion of the entity and being associated with geographic coordinates;
correlating the second image data with a locale based at least in part on the geographic coordinates;
analyzing the second image data to determine the category associated with the entity;
determining a dataset representative of a geographic area for which a search is to be performed based at least in part on the geographic coordinates; and
identifying a listing corresponding to the search, wherein the listing is associated with a location in the geographic area and the category.

19. The method of claim 18, further comprising:
causing interactive information representative of the identified listing to be displayed;
receiving an indication that the listing does not include the entity; and
generating an event to provide business information of the entity.

20. The method of claim 16, further comprising:
receiving second image data form a computing device that includes a representation of the entity;
analyzing the second image data to identify the entity;
retrieving content associated with the entity; and
providing the content to the computing device, wherein the content includes at least one of promotional coupons, menus, advertisements, reservation systems, floor plans, videos, customer reviews, wait time, daily specials, recommendations of items offered by the entity, or related entities.

\* \* \* \* \*